Dec. 15, 1959 G. STRANSKY 2,917,017

HATCH COVER ARRANGEMENT

Filed Aug. 12, 1954 5 Sheets-Sheet 1

INVENTOR
GUSTAVE STRANSKY

BY Glascock Downing & Seebold
ATTORNEYS

Dec. 15, 1959 G. STRANSKY 2,917,017

HATCH COVER ARRANGEMENT

Filed Aug. 12, 1954 5 Sheets-Sheet 2

INVENTOR
GUSTAVE STRANSKY

BY Haseck Downing & Seebold

ATTORNEYS

Dec. 15, 1959 G. STRANSKY 2,917,017

HATCH COVER ARRANGEMENT

Filed Aug. 12, 1954 5 Sheets-Sheet 3

INVENTOR
GUSTAVE STRANSKY

BY Glascock Downing & Seebold

ATTORNEYS

Dec. 15, 1959 G. STRANSKY 2,917,017

HATCH COVER ARRANGEMENT

Filed Aug. 12, 1954 5 Sheets-Sheet 4

INVENTOR

GUSTAVE STRANSKY

BY Glascock Downing & Seebold

ATTORNEYS

HATCH COVER ARRANGEMENT

Filed Aug. 12, 1954 5 Sheets-Sheet 5

INVENTOR
GUSTAVE STRANSKY

BY Glascock Downing & Seebold
ATTORNEYS 2,917,017
Patented Dec. 15, 1959

2,917,017

HATCH COVER ARRANGEMENT

Gustave Stransky, New York, N.Y.

Application August 12, 1954, Serial No. 449,368
21 Claims. (Cl. 114—202)

The present invention relates broadly to the art of ship building and more particularly relates to improvements in hatch cover constructions.

Still more particularly this invention relates to a hatch cover construction such that for all practical purposes it can be termed a flush cover. In other words the top of the cover section or sections and the adjacent deck or coaming surface are either flush or the top of the cover section or sections is only slightly elevated above the adjacent deck surface.

The invention is still more particularly related to hatch cover constructions of the hinged type. By hinged type, is meant an arrangement in which a single section is hinged or pivoted for movement adjacent one end of a hatch opening and closes the opening or an arrangement in which the opening is closed by two cover sections only each hinged adjacent one end of an opening. Additionally the arrangement can comprise two pairs of hingedly interconnected cover sections with one section of each pair hinged at one end of the opening and one section of the other pair hinged at the opposite end of the opening. The invention thus relates to cover constructions as aforementioned or to any of the conventional hinged or folding type cover constructions insofar as the movement of the covers between open and closed position is concerned.

Accordingly, the present invention has for an object to provide an improved hatch cover construction of the hinged type in which for all practical purposes the top cover surface can be designated as flush and which incorporates an improved water tight seal construction.

It is a further object of this invention to provide hatch covers of the type above set forth with an improved dogging means for securing the cover section or sections in closed position.

As a more specific object this invention provides a rack operated wedge type dogging means including a wedging dog movable laterally of the joint to be secured and in which the cooperating parts of the dogging means are housed below deck level.

It is a further object to provide an improved mounting for cover supporting wheels and in those arrangements in which one or more pairs of wheels are embodied with the hatch cover construction to support the cover for folding movement relative to the plane of the hatch opening.

It is a still more specific object of this invention to provide an improved water tight seal between one or more cover sections and the periphery of the opening which seal is effective substantially at deck level and the construction incorporates means to eliminate water pockets.

Figure 1:
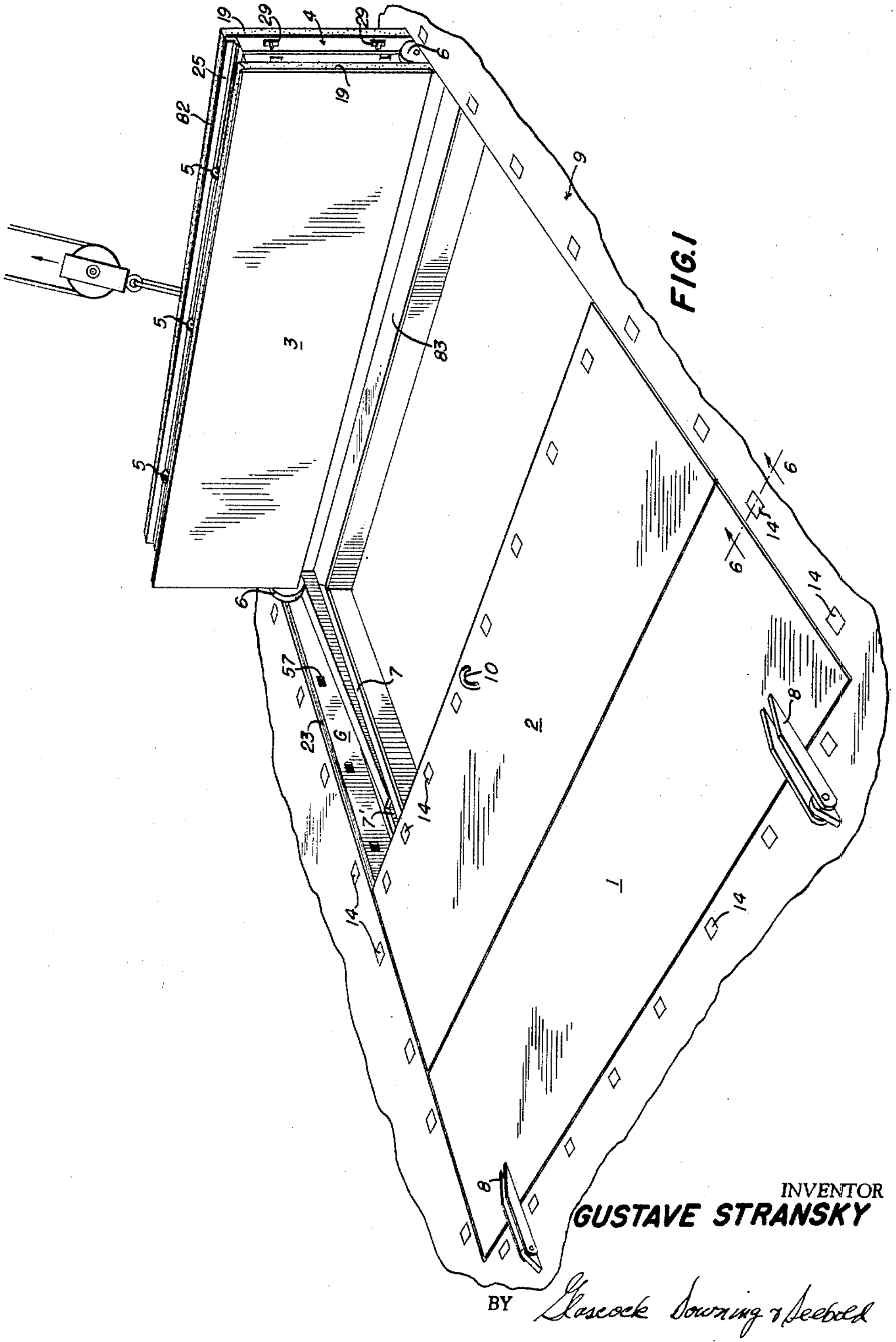
Figure 2:
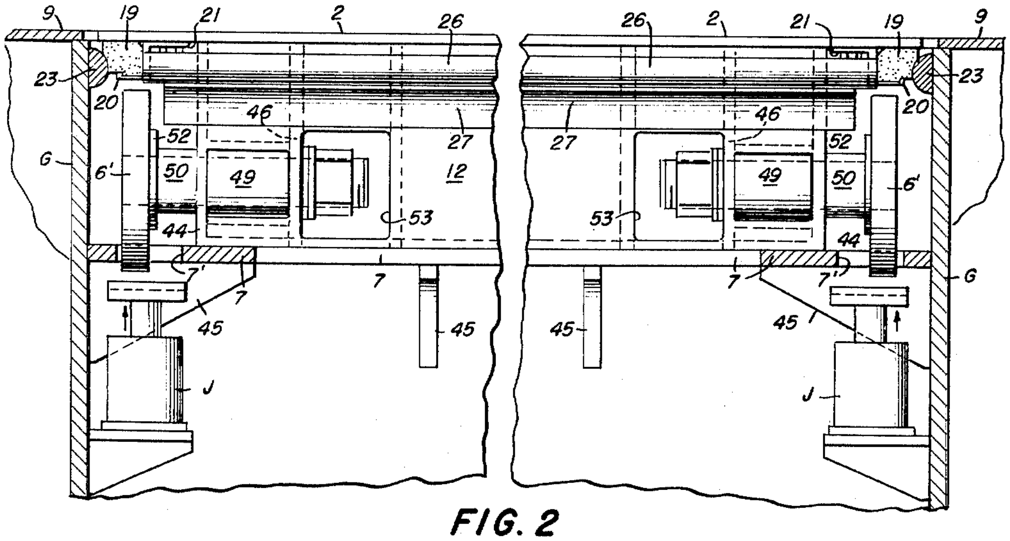
Figure 3:
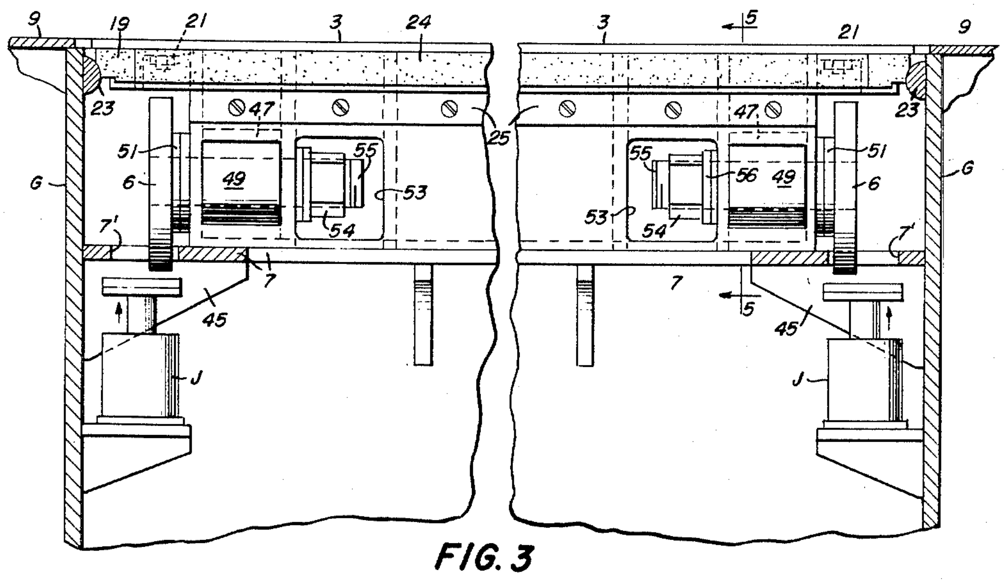
Figures 4, 5, 6, 7, 8:
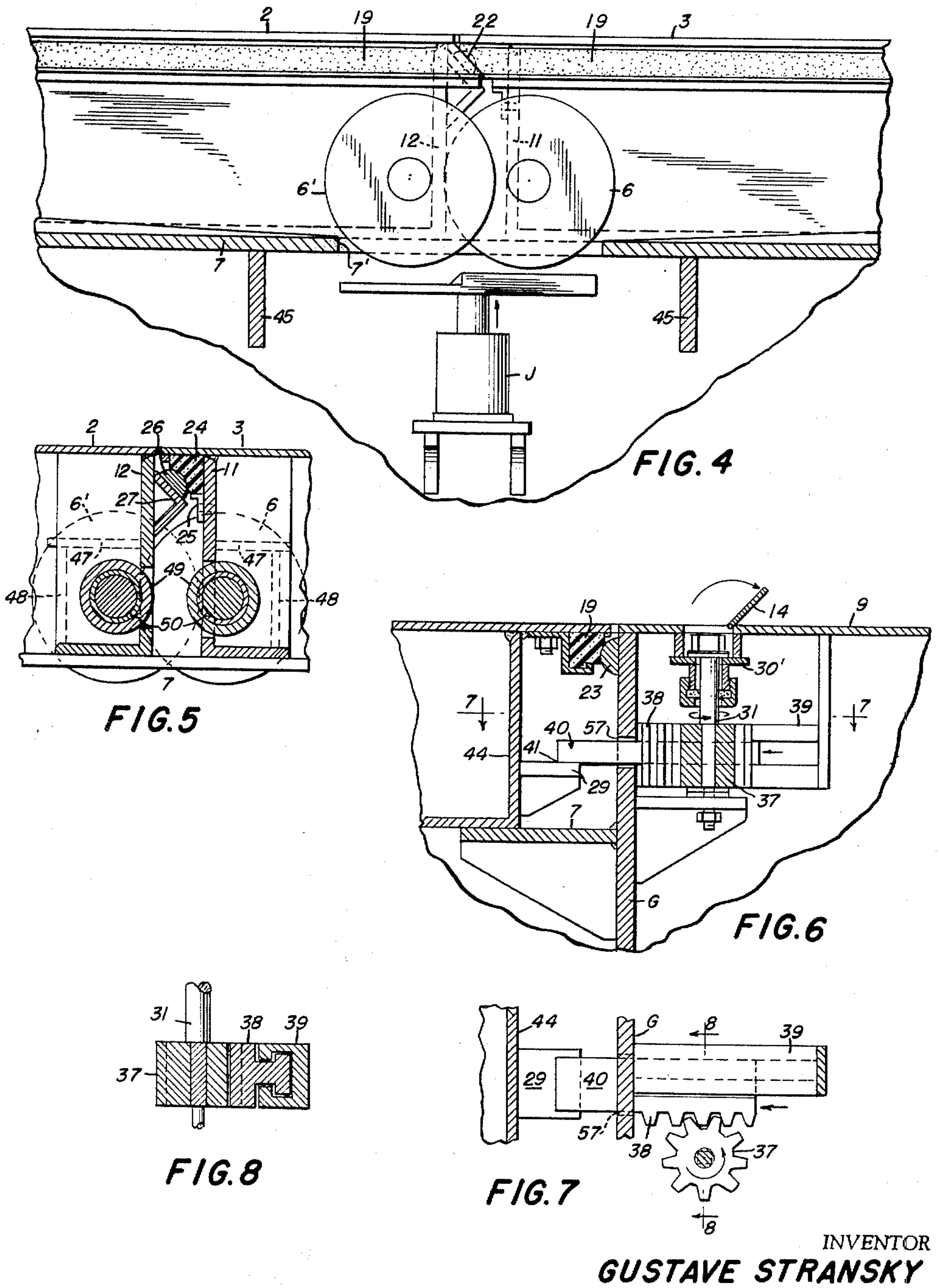
Figure 9:
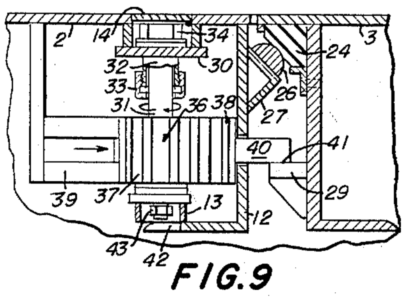
Figure 10:
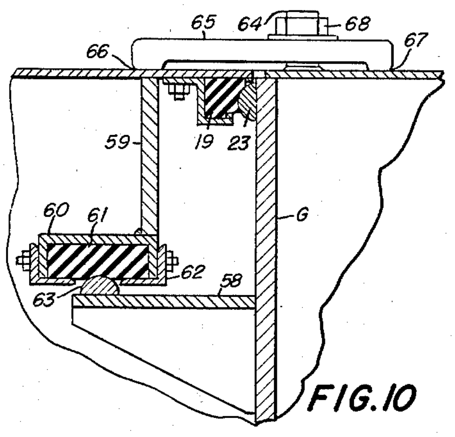
Figure 13:
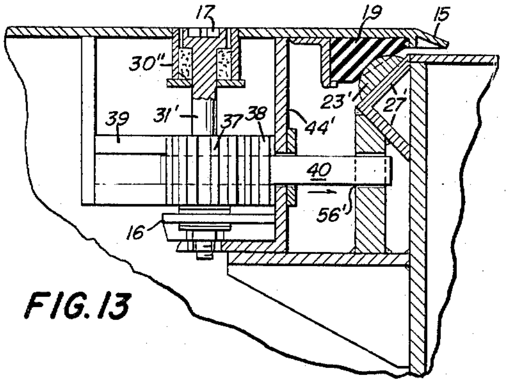
Figure 14:
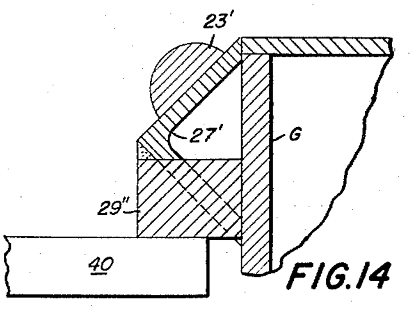
Figure 15:
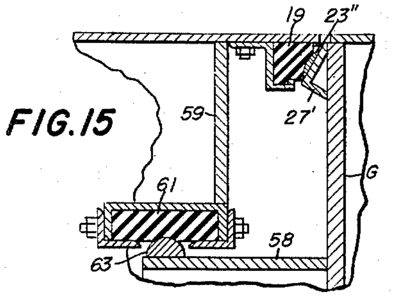
Figure 16:
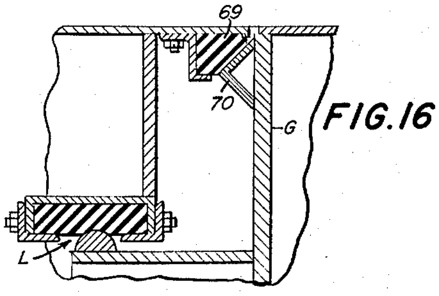
Figure 11:
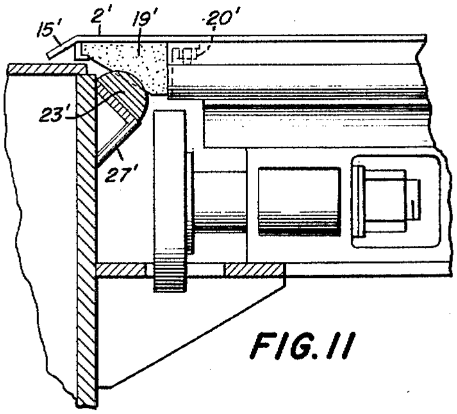
Figure 12:
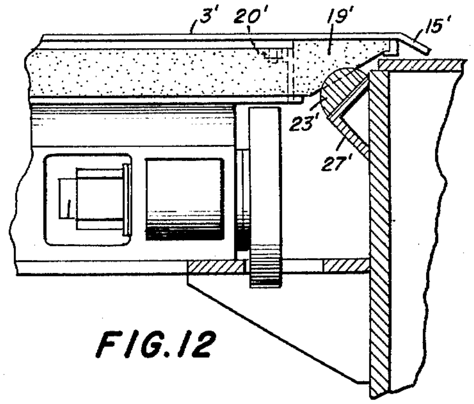
Figure 17:
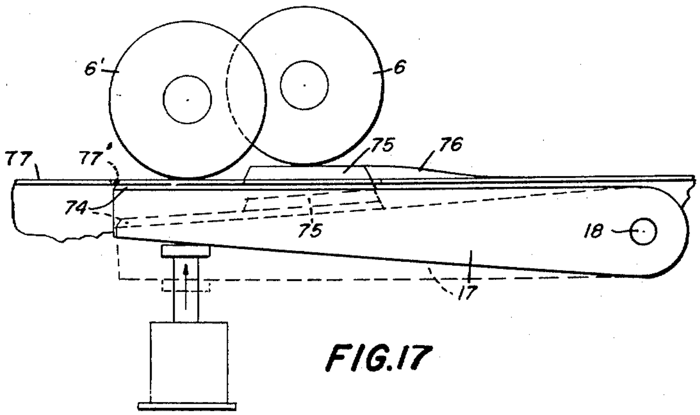
Figure 18:
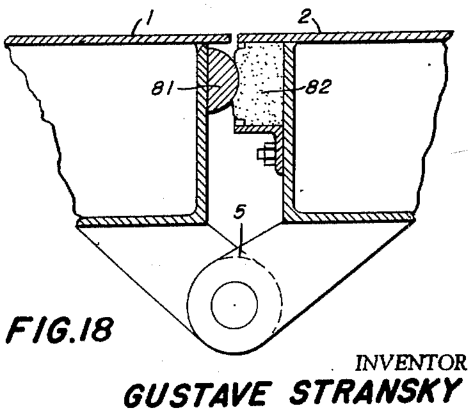

Further and more specific objects will be apparent from the following description taken in connections with the accompanying drawings, in which:

Figure 1 is a fragmentary perspective view illustrating one form of flush type cover in accordance with this invention showing two pairs of cover sections cooperating with a hatch opening and with one pair of sections moved to hatch opening relation, Figures 2 and 3 are respectively fragmentary views on an enlarged scale partly in section and partly in elevation and illustrating the facing ends of the pair of cover sections in Figure 1 that meet at the center joint when these sections are in closing relation, Figure 4 is a fragmentary view on an enlarged scale and illustrating the meeting ends of the center cover sections as viewed from the side, Figure 5 is a cross sectional view taken through the meeting cover sections inboard of the side plates of these sections such as along line 5—5 of Figure 3, Figure 6 is a cross sectional view taken on an enlarged scale along lines 6—6 of Figure 1 at one side of the hatch cover arrangement and illustrating a form of peripheral dogging arrangement for securing the covers in position, Figure 7 is a cross sectional view taken on lines 7—7 of Figure 6, Figure 8 is a fragmentary cross sectional view taken on lines 8—8 of Figure 7, Figure 9 is a cross sectional view of a center joint construction illustrating a dogging arrangement of the general type shown in Figure 6 for dogging down the cover sections that meet at the centr of the hatch opening, Figure 10 is an enlarged view partly in cross section and partly in elevation at one side of a cover section, and illustrating a modified peripheral joint construction as well as a cushioning arrangement, Figures 11 and 12 are fragmentary views similar to the lefthand side of Figure 2 and the righthand side of Figure 3 respectively, and illustrating similar details of construction of a modified cover arrangement, Figure 13 is a cross-sectional view similar to Figure 10 by illustrating a dogging arrangement for the cover sections as shown in Figures 11 and 12 in which the dogging means are carried by the cover sections, Figure 14 is a fragmentary cross-sectional view illustrating a modified form of dogging means of the type in Figure 13, Figures 15 and 16 respectively are cross-sectional views similar to Figures 6 and 9 and illustrating modified forms of peripheral sealing relationships extending along the sides of the cover sections, Figure 17 is a diagrammatic view illustrating a modified wheel lifting arrangement, Figure 18 is a fragmentary cross sectional view through the intermediate joint between interconnected cover sections.

As shown in the drawings, Figure 1 illustrates a typical application of the present invention in which a hatch way is closed by four cover sections 1, 2, 3 and 4. The sections 1, 2, 3 and 4 are pivotally connected in pairs by hinge means shown at 5 and the front section of each pair remote from the end edges of the hatch, namely sections 2 and 3, are provided with wheels 6 rolling on a ledge 7 to support the covers and facilitate their folding movement to cover opening and closing positions. Main hinges 8 pivotally connect cover sections 1 and 4 to the deck. Suitable gasketing means as described in detail hereinafter are cooperatively mounted between each cover section and the periphery of the hatch opening and between the meeting edges of interconnected cover sections 1, 2, 3 and 4 respectively. As clearly shown in the drawings the top surface of the respective cover sections when in closed position lie flush with the deck 9. The cover sections are dogged down by dogging means discussed hereinafter and arranged around the periphery of the hatch opening in any desired spacing and number consistent with the requirements. Similar dogging means are mounted on sections 2 or 3 to dog down the center joint. The ledge 7, as shown in Figure 1, is inclined so that when the cover section 3 is unfolded and lowered in closed position the roller or wheel 6 will be at such a position relative to the upper edge of the opening that the cover can be clamped down to seal the gasket means. To open and close the cover I have illustrated the use of a block and tackle that is supported by a suitable boom, not shown, with the cable being payed in and out from the usual deck winch. A lifting eye 10 is provided on top of the cover sections 1 and 4 to be used when raising or lowering the covers.

Obviously the mechanism utilized for opening and closing the covers does not form a part of the present invention and many of the means known in the art for manipulating covers of the type involved can be employed. For example, I may utilize the power operating means disclosed in my prior filed application Serial No. 422,470, filed April 12, 1954 and entitled "Power Operating Means for Opening and Closing Closures Particularly Hatch Cover Arrangements," or any similar type arrangement.

The sealing arrangement for the cover sections of the type illustrated in Figure 1 and as shown in detail in Figures 2 and 3 includes peripheral gasket strips 19 and cooperating half-round bars 23. A gasket strip extends along the side edge of each cover section subjacent to the top cover plate and is supported in a channel formed by angle irons 20 secured to the under side of the top of the cover by nut and bolt means 21. Where the cover sections are hinged together and at the junction between cover sections 2 and 3 the side gasket strips 19 extend beyond the adjacent end walls 11 and 12 of the respective cover sections and have beveled edges as shown at 22 so that when the sections are clamped together these edges overlap and there is a gasket to gasket seal, Figure 4. The side gaskets each seal against the half-round 23 that is welded adjacent the top of the side girders G or coaming members that delimit the opening. A similar seal extends along the opposite end edges of the hatch opening, that is the edges adjacent to respective hinges 8. The seal between the sections 2 and 3 as shown in Figure 5, includes a gasket element 24 housed beneath an extension of the top cover plate of section 3 and exchangeably supported in place by removable angle strip 25. The gasket strip 24 seals against a half-rounded bar 26 welded on to an angle shaped supporting bar 27. As shown in Figures 2 and 3 the half-round compression bar 26 and the cooperating gasket strip 24 respectively extend transversely of the cover sections to a position flush with the rear of strip 19 so that when cover sections 2 and 3 are dogged together an adequate seal exists between the adjacent ends thereof and an effective water tight seal exists around the periphery of the opening.

A preferable dogging construction is that shown in Figures 6 to 9 which illustrate an arrangement in which all of the dogs are housed below deck level.

Figures 6 to 8 illustrate a peripheral dogging arrangement in which the movable components are housed below the deck while Figure 9 illustrates a center joint dogging arrangement which tighten cover sections 2 and 3 in place. In these arrangements a plurality of rack operated wedging dogs are carried by the end of cover section 2 for cooperation with bearing or reaction surfaces formed on blocks or bars one of which is shown at 29. The blocks are carried by the adjacent cover section 3. Similar dogs are disposed beneath the deck along the sides and ends of the opening as described hereinafter. The top plate of cover section 2 is apertured and a cup shaped housing 30 is welded to the under side of this top plate beneath each aperture. A shaft 31 is passed through an aperture in the bottom of this housing and is guided by a sleeve 32 welded to the bottom of cup shaped housing 30 and a cap 33 is threaded over this sleeve 32 to compress a graphited asbestos packing around the shaft 31. The top of the shaft has a head 34 thereon and suitable washers 35 are interposed between this head and the base of the cup shaped housing 30. The bottom of the shaft 31 is squared as at 36 and secured thereon is a gear 37 having teeth meshing with a rack 38 guided in a guide way 39 for movement toward and away from the adjacent cover section end plate 12. This end plate is apertured and a wedge dog 40 having a chamfered under surface as at 41 is movable therethrough for cooperation with the top surface of the bracket supported reaction element 29. The bottom of shaft 31 lies in another housing 13 welded over a notched out portion of the lower web 42 of the angle shaped end plate 12 of the cover section 2. This notched out portion permits the insertion of tools to remove the nut 43 that secures the shaft in place. With the nut removed the shaft can be withdrawn through the opening in the top cover plate. If desired a cover 14, as disclosed hereinafter, can be used to close the opening above the head 34. The operation of the dogging means is believed clear. When the cover sections are lowered into place the dogs are actuated by the placing of a suitable socket wrench or tool over or in the heads to rotate the gears 37 to extend the dogs to the right to the position shown in Figure 9 whereby the chamfered bottom surface 41 establishes a wedging action on surface 29 to maintain a tight seal between gasket 24 and the half-round compression bar 26.

The top of the cover plate can be suitably marked so as to provide an indication of when the wedging dogs have been driven home.

It is to be understood that as many center joint dogs as are necessary are to be provided in dependence upon the dimensions of the particular hatch cover arrangement.

The end sections 2 and 3 of each pair of the respective cover sections have wheels adjacent the outer corners thereof. With reference to Figures 2 and 3, the angle-shaped cover side plates 44 are disposed a substantial distance inward of the side edges of the top of the cover. The supporting wheels roll on a ledge or track 7 which is supported by plurality of brackets 45. The track 7, as diagrammatically shown in Figures 2 and 3, is provided with cut outs or openings as at 7′ and the wheels 6 of cover section 3 are disposed inwardly of the wheels 6′ of cover section 2. This permits the wheels to assume an overlapping relationship when the hatch cover is closed. Furthermore the notches or cut outs in the tracks permit the bottoms of angle-shaped side plates 44 of the cover sections to rest on top of the ledge, track or shelf.

In order to facilitate the assembly and disassembly of the wheels relative to the cover sections I have provided a novel arrangement in which each wheel is fast with its shaft. The shafts are respectively mounted in a housing which includes stiffeners 46 extending between the under surface of the top cover plate and the upper surface of the bottom web of angle-shaped end plates 11 and 12. Between the side plate 44 and the first stiffener 46 are welded horizontal and vertical transverse plates 47 and 48 respectively, to form a shaft enclosure, Figure 5. Also sleeve elements 49 are welded between the adjacent surfaces of the cover side plate 44 and the first stiffener 46. The latter two elements 44 and 46 are apertured and bearings 50 are mounted therein about the shaft of each wheel. Suitable washers 51 are interposed between the inner surface of wheels 6′ and the outer surface of plate 44, Figure 3. The end plate 11 is cut out as at 53 to provide access opening to facilitate access to the nut 54 that is mounted over the threaded end 55 of the wheel shaft. Suitable washers 56 are disposed between the nut and the stiffener 46. Thus by this arrangement each wheel is secured to the cover by mounting means disposed inwards of the side plates of the cover. The wheel mounting of Figure 2 is substantially the same as that of Figure 3 with the exception that each wheel 6′ is displaced laterally outwards from side plates 44 by an extension provided by the use of longer bearing sleeve element 50. Of course, the shaft for each wheel 6′ is also longer and the washers 52 are disposed between the inner surface of wheel 6′ and the outer end of the sleeve elements. An access opening 53 is also formed in the face of cover end plate 12.

In order to break the seal prior to opening the covers and as diagrammatically illustrated, suitable hydraulic jacks J are supported on brackets welded onto the hatch girders at positions underlying the wheels. Hydraulic jacks of this type are of a conventional nature and are operated by suitable remote controls. The lifting plates for the jacks are of sufficient size to underlie both the wheels 6 and 6′.

If desired the track way can have a dip or incline therein which will permit the wheels to drop below the level of the main track surface to permit adequate tightening of the seal joints for the cover sections, and when the covers are initially moved in their opening movement the movement of the wheels up the surface of the incline will break the seal between the gaskets and the compression bars.

The peripheral dogs of the rack operated wedging type are clearly shown in Figures 6 to 8. As shown in Figure 6 the hatch girder G supports the shelf or ledge 7 by means of suitable brackets. The ledge has sufficient lateral extent to accommodate the wheels as described with reference to Figures 2 and 3 and the bottom webs of the angle-shaped cover side plates 44 rest on the upper surface of the shelf when each cover section is in closed and tightened position. The gasket 19 and half round bar 23 are the same as indicated in Figures 2 and 3. The deck 9 has an aperture therein beneath which is positioned substantially the same structure as previously described with reference to Figure 9. In Figure 6 the housing 30′ is apertured and has an externally threaded sleeve welded to the base thereof for guiding the shaft which carries the gear 37 that actuates the rack 38 that moves the wedge dog 40. The structure is further completed by a brace 52 welded to the under surface of the deck plate and beneath which and the outer side of the hatch girder is a guideway 39. This guideway is T-shaped in cross section, Figure 8, and the wedge dog 40 has upper and lower extensions riding in this guideway. The rack 38 is formed on the side of the wedge dog. The arrangement is such that rotation of the head 34 at the top of the actuating shaft 31 moves the dog right or left, depending on the direction of rotation. A hinged cover 14 closes the aperture in the deck so that the top of the deck is a flat surface and no part of the operating means for the dogs is visible when the cover is closed. Of course, the hatch girder has an opening 57 therein through which the dog is movable.

It is clear, therefore, that the invention provides rack-operated wedging dogs for maintaining the gasket and compression bars together to secure a tight seal and in which the operating means for the dogs are housed below the level of the deck and the top of the cover.

Figure 10 illustrates a modification in which the hatch girder G has welded thereto a bracket supported ledge 58. The base of the cover side plates 59 have a channel iron 60 welded thereon for supporting a gasket strip 61. The strip is exchangeably held in place by angle members 62 bolted to the channel iron 60. A half round compression bar 63 extends along the ledge or shelf on the upper surface thereof adjacent the inner edge. The upper peripheral seal is effected by the cooperation between half round compression bar 23 and gasket strip 19 as in the previous figures. In this form the dogging arrangement is of a modified type and includes a stud 64 welded to the top of the deck. Disposed on the stud is a swingable clamping member or dog 65 having down turned edges 66 and 67. A washer and nut assembly 68 is threaded over the top of the stud. It is believed clear that when the nut is backed off the stud the dog 65 can be swung from the position illustrated to a position in which it is parallel with the hatch girder G so that a cover section may be moved to open position.

Figures 11 and 12 illustrate, in views similar to Figures 2 and 3, a modification in which the tops of the cover sections, such as 2′ and 3′, include edge portions which project laterally over the adjacent deck surface so that the cover arrangement in effect overlaps the periphery of the opening. The portion that overlaps is inclined downwardly toward the deck as clearly shown in the drawings.

In this form of the invention each cover section has a side gasket 19′ which is bevel-shaped and housed beneath the cover top plate by a bolted angle iron support 20′. These supports can be removed if it is necessary to replace or exchange gasket strips.

Welded adjacent the top of the side and end girders for the hatch opening are angle bars 27′ similar to the bars 27 in Figure 5 but disposed closer to the top of the hatch opening. Welded on these bars are half round compression bars 23′ for cooperation with the gasket strips 19′. In this modification the angle shaped gasket strips 19′ and the disposition of the half round compression bar 23′ on an angle facilitates the sealing action by enhancing the alignment of the cover in the opening.

The center joint construction for this arrangement is the same as is illustrated in Figure 9 even including the rack operated wedge type dogging means. The wheel mounting arrangement is the same as shown in Figures 2 and 3. In this form as well as in the arrangement of Figures 2 and 3 the wheel mounting is for the purpose of reducing the lateral shelf requirements. Likewise the wheel mounting permits the overlapping of the wheels when the covers are in closed position.

In the arrangement of Figures 11 and 12, cover section 2′ carries a half round compression bar mounted on an angle bar which is welded at its free ends to the end wall of the cover section. Cover section 3′ carries a gasket stripping for cooperation with the half round bar. The gasket stripping has a mounting as shown in Figures 5 and 9. It is to be further pointed out that the half round compression bar and the gasket stripping extend transversely of the cover from positions in engagement at their opposite ends with the side gasket strips 19′. The latter are beveled at their ends in the same manner as shown at 22 in Figure 4.

The top of the cover has lateral extensions 15 which project over the top of the deck and are bent down toward the same.

Figure 13 illustrates in cross section the form of dogging means incorporated with the arrangement of cover sections shown in Figures 11 and 12 and in which the movable components are carried by the cover sections and are arranged around the periphery of the opening. In this arrangement a cup-shaped housing 30″ is welded within an opening formed in the cover plate. The operating shaft 31′ for the spur gear 37 passes through an aperture in the base of the housing 30″ and the headed end of this shaft is drawn tight against a graphited asbestos packing that is disposed in the base of the cup-shaped housing. The wedging dog element 40 includes a rack surface engaged by the gear 37 and in this embodiment the upper surface of the wedging dog is beveled or chamfered for cooperation with an aperture 56′ formed in a web or plate element that is welded between the upper surface of the ledge and the under and inclined surface of the angle bar that supports the half round 23′. The lower web of the cover side plate 44′ is notched to provide access to the securing bolt on the lower end of the shaft 31′. It is to be noted that in this form the shaft passes through an aperture in a bracket 16 that is suitably secured to the cover side plate so that when the bolts on the end of shaft 31′ are tightened the shaft is drawn down in place.

The head at the upper end of shaft 31′ is suitably slotted as at 17, so as to receive the end of a suitable wrench of the inserted type for turning shaft 31' to actuate the rack and thus the wedge dog.

Figure 14 is a fragmentary view illustrating a modification in which the wedging dogs along the periphery of the opening engage beneath a block 29'' that is welded to the hatch girder. In this modification the angle iron 27' supports the half round bar 23'. In the form illustrated the lower web of the angle iron 27' that supports the half round is notched out to accommodate the blocks 21'' that are provided along the periphery of the hatch girder G. It is believed obvious that a reaction block surface can be provided in other ways than by disposing it at the particular level that it is. It is clear that the entire rack and assembly could be at a slightly lower level and the reaction blocks welded to the hatch girder below the angle iron. The principle illustrated in Figures 13 and 14 is a mere reversal of parts of the arrangement of Figures 6 to 8 in that in Figures 13 and 14 the upper surface of the wedge dog is the active surface and the movable components are carried by the cover sections rather than by the adjacent deck portions as in Figures 6 to 8.

Further the overhang at the perimetrical edges of the cover sections and denoted at 15 covers the joint between the cover sections and the hatch opening and is inclined downwardly so as not to impede moving a vehicle over the hatch cover. If desired this overhang may be eliminated and an inclined or arcuate brow plate welded to the deck adjacent to the edge of the opening.

Figure 15 illustrates a modified form of a double seat in which the track 58' carries a half round bar 63 adjacent the edge thereof for cooperation with a gasket 61 carried by the side plate 59 of a cover section. The upper seal includes a gasket 19 mounted beneath the top plate of the cover by angle member 20 for cooperation with a half-round bar 23'' which is welded to an angle member 27', in turn welded to the hatch girder G. The angularity of the half round bar as regards its mounting to the hatch girder facilitates aligning the cover in the opening.

Figure 16 discloses a modified form in which the lower seal or seat generally designated at L is the same as in Figure 15. The half round bar at the top of the hatch girder has been eliminated and the gasket 69 seals against an angle member 70 welded to the inner surface of a hatch girder G.

Figure 17 diagrammatically illustrates a very important feature of the invention with reference to means for lifting the wheels of the covers. As has been described previously, the wheels when the covers are in closed position are in overlapped arrangement. The supporting ledge or track could be inclined or recessed as stated previously and shown diagrammatically at 7''' in Figure 4 so that when the covers are pulled to opened position the initial movement thereof breaks the seal. Further suitable jacks can be mounted beneath the wheels where the ledge or shelf is cut out. In this particular arrangement illustrated the track or ledge 77 that extends along the sides of the opening is cut out as at 77' in that area that underlies the wheels. The lifting mechanism includes a lifting arm 17 pivoted at 18 to the hatch girder. The upper surface of this lifting arm is a two-level lifting surface as at 74 and 75. Secured to the top of the shelf 7'' is an inclined track portion 76. A suitable and conventional hydraulic jack is bracket supported beneath the lifting arm so that when the latter is raised from the dotted line position to the full line position the wheels are elevated to break the seal. The wheel 6' is raised to the level of the adjacent shelf surface while the wheel 6 is raised to the level of the stationary track portion 78 and thus at a higher level.

It is to be understood that this particular lifting arrangement can be utilized in any hatch cover construction whether or not the wheels are in overlapped relationship and/or regardless of whether the cover is of the flush type or whether it is cooperating with a raised coaming.

In Figure 18 is shown in detail the intermediate joint or seal between sections 1 and 2 or 3 and 4. In Figure 23, cover section 1 has on its end plate a half round bar 81 welded immediately subjacent the top plate. This half round bar extends the full extent of the end plate. On the adjacent cover section 2 and on the end plate thereof is removably mounted a gasket strip 82. This gasket strip is held in place by an angle bar that is bolted to the cover end plate and also extends the full length of the cover end plate and abuts against the inner surfaces of side gaskets as at 19, Figures 2 and 3, carried by cover sections 1 and 2. It is also to be noted that this joint seal is what is to be termed a top seal.

The hinge 5 for the intermediate joint is of conventional nature.

It is therefore clear that the present invention provides a hatch cover arrangement that is water tight and in which one or more sections cover the opening. The general construction is of the hinged type cover and the peripheral seal includes a metallic sealing surface at least closely adjacent the deck level for cooperation with a compressible gasket stripping carried beneath the periphery of the cover section or sections.

In one form the covers are flush with the deck level and the seal includes a half round welded to the side girder of the hatch way for cooperation with a gasket of substantially square section mounted beneath the top of the cover.

In another arrangement for a completely flush cover the half round is supported on an angle member carried at the top of the hatch girder.

The invention further comprehends an arrangement in which the gasket stripping carried beneath the periphery of the cover has a laterally exposed surface and the metal stripping is a rounded compression bar welded to the upper surface of an angle member that has its free ends welded immediately adjacent the top of the hatch girders, Figures 11 and 15. Figure 16 illustrates an arrangement which eliminates the rounded metal compression bar. In these forms the peripheral gasket stripping is rounded on its laterally exposed surface for engagement on the upper surface of an angle member welded at its free ends to the hatch girders.

The invention contemplates either a single or double seal between the cover and the opening, incorporates a wheel mounting in which the elements that support the wheels in position are inwardly of the side plates of the cover and further includes rack-operated wedging dogs for maintaining the cover relative to the track way and for tightening the end sections of adjacent inter-connected pairs of sections together.

As a specific arrangement, the invention contemplates a water-tight hatch cover for vessels which includes a vertically disposed hatch girder delimiting the opening, trackways secured to the hatch girder beneath the deck, a first pair of cover sections pivotally interconnected together with one section of the pair pivoted for movement relative to one end of the opening, a second pair of cover sections pivotally inter-connected and with one section of this pair pivoted for movement relative to the opposite end of the opening. Peripheral gasket means including a sealing bar and gasket strips are carried respectively by the sections and girder for sealing the periphery of the opening, additional gasket means including sealing bars and gasket strips are carried by the adjacent end edges of adjacent cover sections for sealing the space between the cover sections. The cover sections are so dimensioned relative to the distance between the trackway and the deck that in closed position the top of the cover lies at least substantially flush with the deck. Dogging means are provided for dogging the said other sections of each pair together to tighten the seal therebetween and further dogging means are disposed around the periphery of the opening for maintaining the peripheral seal. Wheels are carried adjacent the outer edge of each said other section of the respective pair of sections for supporting the covers in their folding and unfolding movements between open and closed position.

Specifically the invention comprehends rack-operated wedging dogs including components carried by one of said other sections of each pair and components carried by the adjacent said other section of each pair for cooperation in dogging these sections together and, further, rack-operated wedging dogging means including components supported in part by the hatch girder and in part by the cover sections for tightening the peripheral seal. As a further feature, all components of the rack-operated wedging dog means are disposed beneath the level of the deck and top cover plate.

The invention further contemplates a compressible gasket strip carried by the lower edge of the cover side plates for cooperating engagement with a half round bar carried by the upper surface of the shelf. This arrangement thus provides a more resilient or yielding support for the cover section or sections and at the same time may constitute a double seal. Further if desirous, the ledge or shelf formation can extend across the end edges of the hatch as at 83, Figure 1.

It is further to be pointed out that the particular dogging arrangement constituted by the rack-operated wedge type dog is not to be restricted to flush covers and the wheel mounting is similarly of broad application. However the particular rack-operated wedge type dogging means and the particular wheel mounting as regards the housing and accessibility of the components thereof are specifically coordinated with the depth of the cover side plates and the arrangement in this position of the gasket strips and seal bars to provide a flush or substantially flush cover arrangement that is water tight and adequately supported.

Further it is to be expressly understood that the sealing arrangement can be utilized in instances where a raised coaming defines the hatch opening. In such event the intermediate seals and center joint seals if required can be the same as in the drawings and any one of the various peripheral seals can be used so long as the metallic sealing stripping means are carried inboard of the opening.

I wish to point out that an important aspect of this invention is the center joint seal independent of the particular construction of a periphery seal. Further the various sealing arrangements disclosed can be utilized in instances where the over-all cover arrangement is not of the flush type but includes a raised coaming.

What I claim is:

1. In a hatch cover arrangement, vertically disposed means defining a hatch opening, a cover means including at least two cover sections adapted to close the opening, each section including depending end and side means, ledge means supported below the top of the vertically disposed means at least at the sides of the opening and including surfaces for supporting the sections in cover closing relation, said ledge means being at a level so coordinated with the depending extent of the side means of the cover sections that the tops of the sections lie at least closely adjacent the level of the top of the vertically disposed means, a metallic compression stripping means having downwardly and inwardly extending surfaces carried internally of the vertically disposed means at and extending around the upper edge thereof, compressible gasket stripping means carried beneath the periphery of the tops of and exteriorly of the side means and the end means of each section that are adjacent the said metallic stripping means, the gasket stripping along the side means of each section including portions extending beyond the respective end means of the sections that are adjacent one another when the sections are in closing relation, said extending portions of the gasket stripping engaging one another when the sections are closed, a laterally exposed metallic compression stripping carried exteriorly of one of said respective adjacent end means, extending therealong and including opposite ends contacting the extending portions of the gasket stripping means along the sides of said sections, a cooperable laterally exposed gasket stripping means carried by the other of said respective adjacent end means, extending therealong and including opposite ends contacting the extending portion of the gasket stripping means that extend along the sides of said other section and means for tightening and maintaining the sections in cover closing relation to seal the periphery of the opening and the space between said respective adjacent ends of the sections.

2. A hatch cover arrangement as claimed in claim 1 and said means for maintaining the seal comprising rack-operated wedging dog means housed beneath the top of the cover means, the cover side means having apertures therein through which the wedging dog means are movable, the vertical means defining the opening comprising depending hatch girders and reaction surface providing elements connected to the hatch girders for cooperation with the wedging dog means.

3. A hatch cover arrangement as claimed in claim 1 and said means for maintaining the seal comprising rack-operated wedging dog means including complementary dog elements and reaction surface providing elements cooperably associated between the means defining the hatch opening and the side plates of the section and vertical shaft means for actuating the dog elements, and the top surface of said section when in closed and tightened relation lying slightly above the level of the deck, the top of the section including lateral extensions overlying the deck and extending downwardly toward the same for covering the joint between the opening and the sections.

4. A water-tight hatch cover arrangement as claimed in claim 1 in which the metallic compression stripping comprises an angle bar secured by its free edges along the upper inner edge of the vertical wall means so as to present a downwardly and inwardly inclined surface, a half round compression bar secured on said surface, said compressible gasket stripping having a downwardly and inwardly inclined exposed surface for engagement with the compression bar.

5. A water-tight hatch cover arrangement as claimed in claim 1 in which the metallic compression stripping comprises an angle bar secured by its free edges along the upper inner edge of a vertical wall means so as to present a downwardly and inwardly inclined surface, a half round compression bar secured on said surface, said compressible gasket stripping having a downwardly and inwardly inclined under surface for engagement with the compression bar and means removably secured to the under surface of the top of the cover section for replaceably supporting said gasket stripping.

6. A hatch cover arrangement as claimed in claim 1 and further including an angle member including opposite ends secured to the vertically disposed means defining the opening internally thereof and at least closely adjacent the top thereof, and said metallic stripping including a compression bar means having an arcuate surface and an opposite substantially flat surface secured on the angle member with the arcuate surface exposed.

7. A hatch cover arrangement as claimed in claim 1 and the depending side means of each section including a laterally extending base, a compressible stripping carried by the base and facing said ledge means and a cooperable metallic compression stripping carried by the ledge means and cooperable with said last mentioned compressible stripping for cushioning the support of the cover section and supplementing the seal.

8. A hatch cover arrangement as claimed in claim 1 and further including a compressible gasket stripping carried by at least the depending side means of the sections for cushioning the closing of the cover sections on the ledge means.

9. In a steel, water-tight hatch cover construction for vessels, vertical means delimiting a hatch opening, supporting means carried subjacent the top of the vertical means and extending along at least the sides of the opening and inwardly thereof, a plurality of hatch cover sections each including a top and side and end wall means, said top extending laterally beyond the side means of each section means pivotally interconnecting the sections in pairs, means pivotally mounting one section of one pair adjacent one end of the opening, means pivotally mounting one section of another pair adjacent the opposite end of the opening, a positive seal extending parallel to the opposite ends of the opening between the cover sections of each pair and between the adjacent sections of the respective pairs comprising compressible gasket stripping means carried subjacent the top of one section and extending along the end wall means thereof and cooperable metallic compression stripping means similarly carried by the adjacent sections for coperative sealing relation with the gasket stripping, a positive seal between the periphery of the opening and the sections comprising at least closely adjacent the level of the top of the opening a compressible gasket stripping carried by the sections beneath the periphery of each top and extending along the sides thereof and the ends of each of the sections adjacent the ends and sides of the opening and including laterally exposed surfaces and a cooperable metallic compression stripping means carried at the upper edge of the vertical means defining the opening, internally thereof and including downwardly and inwardly extending gasket contacting surfaces, the compressible gasket stripping extending along the sides of the sections including portions projecting beyond the ends of the sections that are respectively adjacent one another and are respectively remote from the opposite ends of the opening adapted to engage one another in sealing relation when the sections are closed and respectively engaging opposite ends of the respective metallic compression stripping means and compressible gasket stripping means carried by the said ends means for maintaining the gasket stripping against the metallic compression stripping to provide a water-tight seal at the periphery of the opening and to tighten the seal between the adjacent sections of the respective pairs of sections and the supporting means carried subjacent the top of the vertical means being at a level so coordinated with the extent of the side and end wall means of the sections that the tops of the sections lie at least closely adjacent the level at the top of the opening when the opening is closed and the seals tightened.

10. In a steel water-tight hatch cover construction as claimed in claim 9 and in which a deck extends beyond the opening from the top of the vertical means and in which the top surface of each cover section when the sections are in closed and tightened relation lying slightly above the level of the deck, and a lateral extension projecting from the top of each cover section, overlying the deck and extending downwardly toward the same for covering the joint between the opening and the cover sections.

11. In a hatch cover arrangement as claimed in claim 9 and a cooperating compressible stripping and metallic compression stripping carried respectively by the depending side wall means and the supporting means for cushioning the support of the cover sections and supplementing the seal.

12. A hatch cover arrangement including means defining an opening, at least two sections for closing the opening, means mounting the sections for movement relative to the opening a positive peripheral seal between the periphery of the opening and the sections and a positive seal between the adjacent and meeting ends of the respective sections comprising an angle bar secured by its free edges along the end of one of said sections so as to present a downwardly and inwardly inclined surface, a half round compression bar secured on said surface and a compressible gasket stripping extending along and secured to the adjacent end of the adjacent section for cooperation with said half round bar, the seal between the periphery of the opening and the sections including a metallic stripping extending around the periphery of the opening, compressible gasket stripping carried by each section for sealing therewith and including free portions projecting beyond the ends of the sections that are adjacent one another in cover closing relation, said free portions being adapted to engage one another in overlapping relation and said half round bar and said first mentioned gasket stripping each having opposite ends in engagement with the interior of the said free portions on the respective sections and the respective metallic stripping and gasket stripping and said bar lying substantially on a common level.

13. In a hatch cover arrangement, vertically disposed means defining a hatch opening, a cover means including at least two cover sections adapted to close the opening, each section including depending end and side means, a metallic compression stripping means having downwardly and inwardly extending surfaces carried internally of the vertically disposed means at and extending around the upper edge thereof, compressible gasket stripping means carried beneath the periphery of the tops of and exteriorly of the side means and the end means of each section that are adjacent the said metallic stripping means, the gasket stripping along the side means of each section including portions extending beyond the respective end means of the sections that are adjacent one another when the sections are in closing relation, said extending portions of the gasket stripping engaging one another in overlapping relationship when the sections are closed, a laterally exposed metallic compression stripping carried exteriorly of one of said respective adjacent end means, extending therealong and including opposite ends contacting the extending portions of the gasket stripping means along the sides of said sections, a cooperable laterally exposed gasket stripping means carried by the other of said respective adjacent end means, extending therealong and including opposite ends contacting the extending portion of the gasket stripping means that extend along the sides of said other section and means for tightening and maintaining the sections in cover closing relation to seal the periphery of the opening and the space between said respective adjacent ends of the sections.

14. In a hatch structure, a deck having a hatch opening therein, a hatch cover means adapted when horizontal to close said opening and including vertical side means, a vertical means delimiting the opening, one of said vertical means having a series of horizontally spaced apertures therein below the level of the top of the opening and extending therearound, the other of said vertical means including horizontal reaction surfaces extending toward and at least opposite each opening, a horizontally movable dog projectable beyond each opening, guide means for each dog mounted beneath the top level of the cover means and behind each opening, rack teeth carried by each dog, gears engaging the respective teeth, a vertical shaft for each gear including an actuating end disposed below the top level of the cover means a cup-shaped housing depending below the level of the opening surrounding said actuating end, and packing gland means operatively associated between said shaft and housing to provide a water-tight packing for the shaft.

15. In a hatch structure, a deck having a hatch opening therein, a hatch cover means adapted to close said opening and including at least two cover sections each having vertical side and end means, a vertical means delimiting the opening, a seal between said vertical means and the perimetrical portions of said sections including cooperating sealing components carried respectively by the sections and said vertical means, a seal between the end means of the sections that are adjacent one another when the covers are closed including cooperable sealing components carried by the respective sections, the last mentioned sealing components including opposite ends engaging and cooperating with the sealing components carried by the side means of the respective sections, means for tightening and maintaining the sections in sealed, closing relation relative to the opening comprising laterally movable rack-operated wedging dog elements and horizontally disposed reaction surface providing elements cooperably associated between said vertical means and the side and remote end means of the sections, all said elements being disposed below the level of said sealing components vertical shaft means operatively coupled to the dog elements for actuating the dog elements into cooperative relationship with said reaction surface providing elements, and packing gland means housed below the level of the top of the opening and surrounding said shaft means in water-tight relationship.

16. In a hatch structure as claimed in claim 15 and further rack-operated wedging dog means carried cooperably between the adjacent end means of the sections.

17. In a hatch structure as claimed in claim 16 in which the rack-operated wedging dog means include in addition to the vertical shaft a gear carried by the shaft, a slide-mounted rack meshing with the gear for movement laterally of the axis of the seal, a dog element movable with the rack and having a chamfered surface, each shaft being entirely housed below the tops of the cover sections, an access opening in each top, and each shaft having headed means on the end thereof accessible through the opening for actuating the shaft.

18. In a hatch structure, vertical means delimiting a hatch opening, a hatch cover means adapted to close the opening and including at least two cover sections each having depending side and end means, a metallic compression stripping carried by the vertical means, gasket stripping carried by the respective sections along the sides and ends thereof that are adjacent the said vertical means, the gasket stripping along the sides including portions extending beyond the end means of the respective sections that are adjacent one another when the sections are closed, said extending portions having beveled ends adapted to overlap when the sections are closed, between the adjacent ends of the respective sections a laterally exposed gasket stripping carried by one section, extending along the end means thereof and including opposite ends engaging the interior of the extending portions of the gasket stripping carried along the sides of the said section, a metallic compression bar supported by the adjacent end means of the other section extending therealong and including opposite ends in engagement with the interior of the extending portions of the gasket stripping carried along the sides of said other section and said metallic compression bar including a portion disposed beyond the vertical median plane between the mutually adjacent end means of the sections when the sections are closed, and means for tightening and maintaining the sections in closing relation whereby the periphery of the opening is adequately sealed, and the joint between the sections is sealed with the respective gasket stripping and compression bar carried by the mutually adjacent end means of the section sealing against one another and against the said extending portions of the gaskets carried along the side means of the sections.

19. A hatch cover arrangement comprising vertical means defining a hatch opening, at least two cover sections pivotally mounted with respect to opposite ends of the opening, each section including a top and depending side and end means, ledge means supported below the top of the vertical means at least at the sides of the opening and extending internally thereof for supporting the sections, said ledge means being at a level so coordinated with the depending extent of the side and end means of the cover sections that the tops of the sections lie at least closely adjacent the level of the top of the opening, a positive seal between the opening and the side and end means of the sections adjacent the opening comprising subjacent the level of the top of the opening a compressible gasket stripping carried by the sections beneath the periphery of the tops of the sections and including laterally exposed side and bottom surfaces, and a cooperable metallic compression stripping carried at the upper edge of the vertical means defining the opening, internally thereof and including downwardly and inwardly extending gasket stripping contacting surfaces, a center joint seal between the adjacent end means of adjacent sections comprising a compressible gasket stripping carried beneath the periphery of the top and by one of said adjacent sections and extending therealong parallel to the ends of the opening, a cooperable metallic stripping carried by the adjacent end means of the adjacent section and subjacent the top thereof, said last mentioned metallic compression stripping extending parallel to the ends of the opening, the compressible gasket stripping extending along the side means of the respective sections including portions extending beyond the end means of the respective sections that are adjacent one another when the sections are closed, said extending portions of the gasket stripping engaging one another when the sections are closed, the compressible gasket stripping and metallic compressible stripping extending along the end means of the sections that are adjacent one another when the sections are closed extending transversely across said end means and including opposite end portions engageable with the interior of said extending portions of the gasket stripping means disposed along the side means of the sections when the sections are closed so that the respective compression gasket stripping and metallic compression stripping of the center joint seal have their opposite ends in sealing relation with the said extending portions and means for maintaining the sealing relation between the respective sections and between the sections and the vertical means defining the opening.

20. A hatch cover arrangement comprising vertical means defining a hatch opening, at least one pair of hingedly interconnected cover sections, means hinging one section of the pair for movement relative to one end of the opening, each section including a top and depending side and end means, said side means being inwardly of the vertical means defining the opening, ledge means supported below the top of the vertical means and extending inwardly thereof at least along the sides of the opening for supporting the sections, said ledge means being at a level so coordinated with the depending extent of the side and end means of the sections that the tops of the sections lie at least closely adjacent the level of the top of the opening when in closing relation, a positive seal between the sections of the pair comprising a compressible gasket stripping carried beneath the top and extending along the end means remote from the said one end of the opening and including opposite ends, and a cooperable metallic compression stripping carried by the adjacent end means of the adjacent section beneath the top thereof and extending along said adjacent end means and including opposite ends, sealing components between the vertical means defining the opening and the side and end means of the sections that are adjacent said vertical means, said sealing components comprising subjacent the level of the top of the opening a compressible gasket stripping carried by the sections beneath the periphery of the tops of the sections and extending along the side means and end means of the respective sections that are adjacent the said one end and the sides of the opening, said gasket stripping including laterally exposed surfaces, said last mentioned compressible gasket stripping including portions projecting beyond the end means of the respective sections that are adjacent the said one end and the sides of the opening, said gasket stripping including laterally exposed surfaces, said last mentioned compressible gasket stripping including portions projecting beyond the end means of the respective sections that are adjacent one another when the sections are in closing relation and which portions are adapted to engage one another in sealing relation, said projecting portions being in engagement with the opposite ends of the respective gasket stripping and the metallic compression stripping extending along the end means of the sections that are adjacent one another, and a cooperable metallic compression stripping carried at the upper edge of the vertical means defining the opening and internally thereof and including downwardly and inwardly extending gasket contacting surfaces and means for tightening and maintaining a sealing relation between the respective sections and between the sections and the adjacent sides and end of the opening.

21. A hatch cover arrangement including means defining an opening, at least two cover sections for closing the opening, means mounting said sections for movement relative to the opening, a positive peripheral seal between the periphery of the opening and the sections, a positive seal between the adjacent and meeting ends of the respective sections comprising an angle bar secured by its free edges along the end of one of said sections so as to present a downwardly and inwardly inclined surface, a compression bar secured on said surface and a compressible gasket stripping extending along and secured to the adjacent end of the adjacent section for cooperation with said compression bar, said positive peripheral seal comprising a metallic stripping means extending around the periphery of the opening, compressible gasket stripping means carried by each section for sealing with said metallic stripping means, said last-mentioned gasket stripping including end portions respectively projecting beyond the ends of the sections that are adjacent one another in cover closing relation, said end portions being adaptedto engage one another in sealing relation when the cover sections are in closing relation and said compression bar and first-mentioned compressible gasket stripping including opposite end portions in engagement with said end portions of the last-mentioned compressible gasket stripping when the sections are in closing relation.

References Cited in the file of this patent

UNITED STATES PATENTS

| | | |
|---|---|---|
| 1,158,946 | McGray | Nov. 2, 1915 |
| 2,656,810 | Jernstrom | Oct. 27, 1953 |
| 2,697,998 | Jernstrom | Dec. 28, 1954 |
| 2,707,928 | Farrell | May 10, 1955 |

FOREIGN PATENTS

| | | |
|---|---|---|
| 10,837 | Great Britain | Aug. 6, 1887 |
| 461,412 | Great Britain | Feb. 16, 1937 |
| 547,419 | Great Britain | Mar. 27, 1942 |
| 667,464 | Great Britain | Mar. 5, 1952 |
| 1,022,796 | France | Dec. 17, 1952 |